Sept. 1, 1959     H. S. FIORE ET AL     2,902,059
CABLE FORMING FIXTURE
Filed July 13, 1956
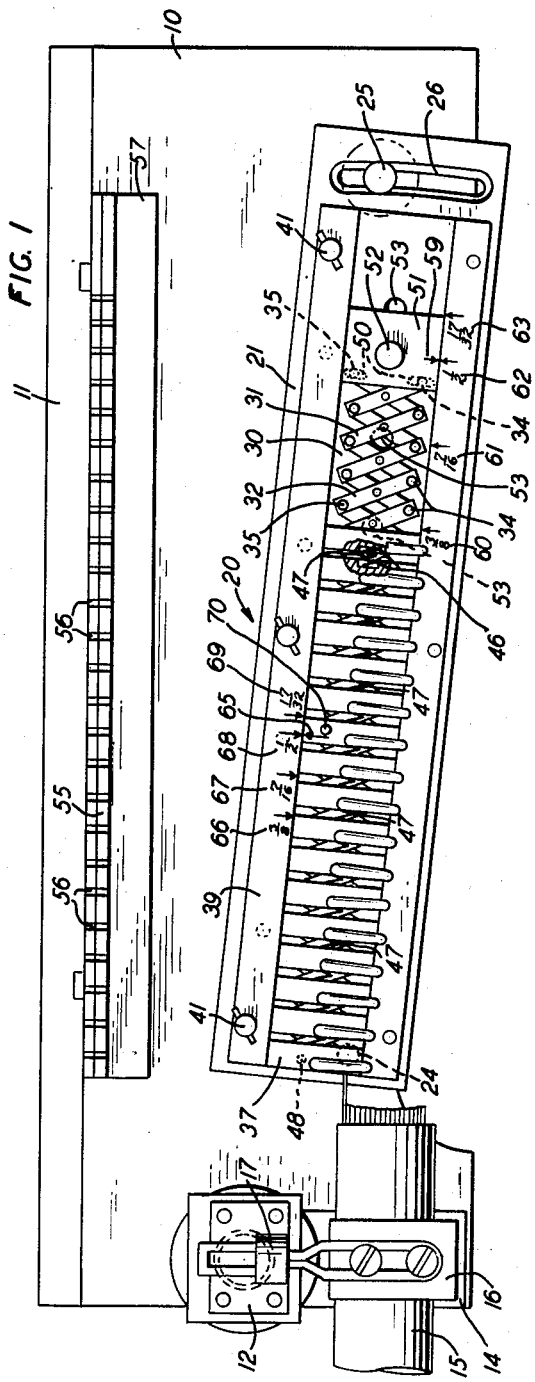
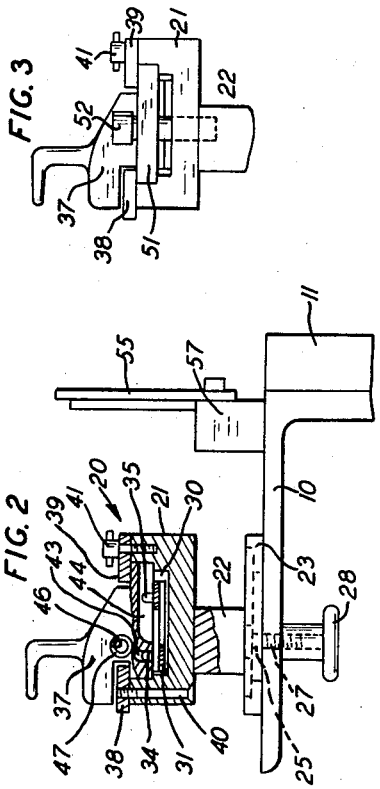
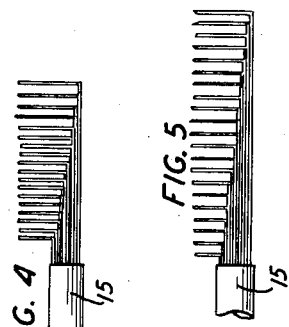
INVENTORS
H. S. FIORE
E. S. GEARY
A. F. PYDE
BY *W. A. Johnson*
ATTORNEY

# United States Patent Office 2,902,059
Patented Sept. 1, 1959

2,902,059

CABLE FORMING FIXTURE

Hannibal S. Fiore, Lodi, Edward S. Geary, Nutley, and Albert F. Pyde, Newark, N.J., assignors to Western Electric Company, Incorporated, New York, N.Y., a corporation of New York Application July 13, 1956, Serial No. 597,745

9 Claims. (Cl. 140—92.1)

This invention relates to adjustable forming fixtures particularly fixtures for forming the ends of cables.

In the manufacture of various electrical equipment, the desired number of insulated electrical conductors are embodied in sheathed cables. The cables are cut into desired lengths, suitable for the equipment and desired lengths of the cable sheath are removed from the ends of the insulated conductors so that they may be formed for attachment to their electrical units. The formations of the insulated conductors vary with the various electrical units and the mounting of the units with respect to each other. Numerous cable forming fixtures have been designed for the individual cable units wherein the elements, about which the various wires are bent manually, are permanently positioned relative to each other and relative to a clamp which is to hold the adjacent end of the sheathed cable. Due to the fact that various types of cable forms are necessary for various arrangements of electrical equipment, for example, in switchboards and telephone exchange equipment, numerous single unit cable forming fixtures would be necessary.

An object of the present invention is a cable forming fixture which, although simple in structure and readily actuable, is highly efficient in accurately spacing the forming elements about which wires of a cable may be formed to permit forming of various types of cable units.

In one embodiment of the invention, according to the object, the adjustable cable forming fixture includes an arm mounted on a support with one end thereof adjacent a clamp for a sheathed cable having the sheath removed back a given distance from the ends of the insulated wires thereof. In this embodiment of the invention, a plurality of individual hooks, about which the insulated wires from the cable may be formed manually, are disposed parallel with each other on the arm while means are actuable to cause simultaneous relative movement of the hooks to space them for different types of cable forms.

More specifically, the individual hooks are supported for sliding movement in guideways of the arm and are held parallel with each other while being connected individually. The links of a pantograph linkage unit are connected through pins to the forming hooks so that, through the actuation of the unit, the forming hooks will be moved like distances relative to each other, to predetermined positions identified by two sets of indicia to assure adjustment of the forming hooks to known positions required for the different types of cable units.

Other objects and advantages will be apparent from the following detailed description when considered in conjunction with the accompanying drawing, wherein:

Fig. 1 is a top plan view of the cable forming fixture;

Fig. 2 is an end elevational view of the cable forming fixture, a portion thereof being shown in section;

Fig. 3 is a fragmentary end elevational view of the arm and,

Figs. 4 and 5 illustrate different types of cable units formed by the fixture.

In the present embodiment of the invention, the fixture includes a support 10, which is an angle member mounted upon any desired structure indicated at 11 and supporting a clamp 12. The clamp 12 may be of any desired commercially known structure having a stationary jaw 14 on which a sheathed cable 15 may be disposed and a movable jaw 16 actuable through a suitable lever 17 to releasably clamp the cable on the support.

An arm 20 is composed of a main or upper member 21, an intermediate member 22 and a lower or plate-like member 23 fixed together to form a solid unit. The arm 20, with its members 21, 22 and 23, is pivotally mounted at 24 on the support 10 and is controlled in its rocking movement by a retaining screw 25. The pivot 24 may be any suitable pin-like member fixed to the support 10 and extending into or through an aperture in the plate-like member 20. The screw 25 extends through an arcuate elongate opening 26 in the opposite end of the member 23 and through an aperture 27 in the support 10 where a nut 28 is mounted on the lower end thereof. By loosening of the nut 28, the arm 20 may slide on the support 10 in a rocking motion about its pivot 24 into any desired angular position with respect to the clamp 12, depending upon the type of cable unit to be formed. When reaching the desired angular position, the arm may be locked against arcuate movement by tightening the nut 28 on the screw 25.

The main member 21 of the arm has a longitudinal recess 30 in the narrower bottom portion of which a pantograph linkage unit 31 is disposed. This unit is composed of a multiplicity of like links 32 positioned in the conventional manner and pivotally connected at their centers and at their outer ends by the pivot pins. The pantograph unit in the present instance has been modified by lengthening the outer pins which are identified by reference numerals 34 and 35 so that they extend upwardly like distances from their respective links as shown in Fig. 2. Forming hooks 37, identical in contour and of the general formation shown in Fig. 2, are positioned parallel with each other, transversely of the wider upper portion of the recess 30 to slidably rest upon shoulders at each side of the narrower portion of the recess housing the pantograph unit. Retaining plates 38 and 39 are mounted respectively upon the upper portions of the member 21 of the arm by screws 40 and 41 respectively to hold the forming hooks 37 against displacement. The screws 41 are of the hand actuated type permitting removal of the plate 39 readily for the removal of any desired number of the forming hooks or the adding of forming hooks to those already assembled. The forming hooks have apertures 43 for receiving the pins 34 and longitudinal grooves 44 for receiving the pins 35. With this arrangement, through actuation of the pantograph linkage unit 31, the forming hooks may be moved relative to each other sliding them on the shoulders in the recess 30 without varying their positions laterally of the arm.

In the present embodiment of the invention the forming hooks have aligned recesses 46 in opposite walls thereof to receive like compressible springs 47 adapted to apply like pressures urging the forming hooks away from each other. The first forming hook 37 at the left (Fig. 1) is held against movement by a pin 48 or any other suitable means. The right end of the pantograph unit has its outer pins 34 and 35 mounted in elongate slots 50 in a slide 51. The slide 51 is positioned in the upper and wider portion of the recess 30 beneath the guide plates 38 and 39 and on the shoulders which support the hooks. The slide 51 is provided with an aperture to receive a pin 52, which may be utilized in moving the slide into any of a plurality of positions, represented by a row of spaced apertures 53, to locate the forming hooks 37 for any desired cable unit.

A comb-like structure 55, having slots 56 to receive the ends of groups of wires, bent manually about the forming hooks, is mounted at 57 on the support 10. The angular adjustment of the arm has been described with respect to the clamp 12 whereas its position with respect to the comb-like structure is equally important.

In the present embodiment of the invention, the slide 51 is provided with an arrow 59 to register with the lines adjacent indicia 60, 61, 62 and 63 for adjustment of the fixture for the cables of different types. In pantograph units there may be certain irregularities in action throughout the length of unit particularly in view of the fact that the pairs of links thereof have to move the forming hooks. The springs 47 serve to balance the action of the pantograph unit and to eliminate any lagging of action, particularly in the portions farthest from the slide 51. However, to determine the possible existence of this condition, a pointer 65 is placed upon the central forming hook and other lines identified by indicia 66, 67, 68 and 69 are mounted on the plate 39 so that the operator through the aid of a pin 70 mounted on the central forming hook, may manually adjust this particular hook until its pointer 65 registers with the corresponding indicia line bringing additional adjustment of the forming hooks from central portion of the pantograph unit.

With the forming fixture in the position shown, and the cable 15 mounted in the clamp, the wires from the cable may, according to their color coding or in any desired formation, be formed manually about the proper forming hooks where their ends are positioned in the slots of the comb 55 until all of the insulated wires of the cable have been disposed in their respective positions, after which they may be tied in a conventional manner the excess length cut therefrom to produce a cable unit, for example, as shown in Fig. 5. The desired number of cable units of this type may be formed successively without modifying or changing the fixture. If a different type of cable unit is to be formed, for example, one wherein the arrow 59 of the slide 51 is to located in registration with the indicia identifying line 60, the pin 52 is removed from its present retaining aperture 53 and the slide is moved until the arrow 59 registers with the line of the indicia 60. At this time the pin is dropped into the adjacent aperture 53. During this action, the pantograph linkage unit is reduced in length imparting like movements to the links thereof and also their respective pins 34 and 35 to compress the springs 47 and move the forming hooks 37 closer together, retaining their parallel relationship by positioning them to form a cable unit of the type shown in Fig. 4. During this adjustment, the operator observes the location of the pointer 65 and if it does not register with the line of the indicia 66, additional adjustment is made by the aid of the pin 70 to bring about this registration. Furthermore, it is desirable to rock the arm 20 about its pivot 24, which action may be accomplished by loosening the nut 28, moving the arm to the angle desired and again tightening the nut 28 on the screw 25. These differences in angles may be observed by the angles formed in the cable units shown in Figs. 4 and 5. These angles, represented by the lines wherein the groups of wires separated by the forming hooks are bent from the main supply of the wires in the cable.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An adjustable cable forming fixture comprising a support, a clamp mounted on the support and adapted to removably hold a sheathed cable having the sheath removed back a given distance from the ends of the insulated wires thereof, an arm mounted on the support with one end thereof adjacent the clamp, a plurality of individual hooks, about which insulated wires from the cable may be formed manually, disposed parallel with each other and at relative spaced positions on the arm, and means actuable to cause simultaneous movement of the hooks to vary their relative position on the arm.

2. An adjustable cable forming fixture comprising a support, a clamp mounted on the support and adapted to removably hold a sheathed cable having the sheath removed back a given distance from the ends of the insulated wires thereof, an arm mounted on the support with one end thereof adjacent the clamp, a plurality of individual hooks, about which insulated wires from the cable may be formed manually, disposed parallel with each other and at relative spaced positions on the arm, means mounted on the arm to guide the hook in their relative movement and to maintain them parallel with each other, and means actuable to cause simultaneous movement of the hooks to vary their relative positions on the arm.

3. An adjustable cable forming fixture comprising a support, a clamp mounted on the support and adapted to removably hold a sheathed cable having the sheath removed back a given distance from the ends of the insulated wires thereof, an arm mounted on the support with one end thereof adjacent the clamp, a plurality of individual hooks, about which insulated wires from the cable may be formed manually, disposed parallel with each other and at relative spaced positions on the arm, means actuable to cause simultaneous movement of the hooks to vary their relative positions on the arm, and means to secure the hooks against displacement in any selected position.

4. An adjustable cable forming fixture comprising a support, a clamp mounted on the support and adapted to removably hold a sheathed cable having the sheath removed back a given distance from the ends of the insulated wires thereof, an arm mounted on the support with one end thereof adjacent the clamp, a plurality of individual hooks about which insulated wires from the cable may be formed manually, disposed parallel with each other and at relative spaced positions on the arm, means interposed between the hooks applying equal forces thereto tending to force the hooks away from each other, and means actuable to cause simultaneous movement of the hooks to vary their relative positions on the arm.

5. An adjustable cable forming fixture comprising a support, a clamp mounted on the support and adapted to removably hold a sheathed cable having the sheath removed back a given distance from the ends of the insulated wires thereof, an arm disposed on the support and having one end thereof adjacent the clamp pivotally connected to the support for movement of the arm into selected angular positions relative to the clamp, a plurality of individual hooks, about which insulated wires from the cable may be formed manually, disposed parallel with each other and at relative spaced positions on the arm, and means actuable to cause simultaneous movement of the hooks to vary their relative positions on the arm.

6. An adjustable cable forming fixture comprising a support, a clamp mounted on the support and adapted to removably hold a sheathed cable having the sheath removed back a given distance from the ends of the insulated wires thereof, an arm disposed on the support and having one end thereof adjacent the clamp pivotally connected to the support for movement of the arm into selected angular positions relative to the clamp, means operatively connected to the other end of the arm to releasably secure the arm in any of the selected positions, a plurality of individual hooks, about which insulated wires from the cable may be formed manually, disposed parallel with each other and at relative spaced positions on the arm, and means actuable to cause simultaneous movement of the hooks to vary their relative positions on the arm.

7. An adjustable cable forming fixture comprising a support, a clamp mounted on the support and adapted to removably hold a sheathed cable having the sheath removed back a given distance from the ends of the insulated wires thereof, an arm mounted on the support with one end thereof adjacent the clamp, a plurality of individual hooks about which insulated wires from the cable may be formed manually, disposed parallel with each other and at relative spaced positions on the arm, and a pantograph linkage unit supported by the arm connected through the links thereof to the hooks and having one end fixed whereby movement of the free end will actuate the unit to cause simultaneous movement of the hooks to vary their relative positions on the arm.

8. An adjustable cable forming fixture comprising a support, a clamp mounted on the support and adapted to removably hold a sheathed cable having the sheath removed back a given distance from the ends of the insulated wires thereof, an arm mounted on the support with one end thereof adjacent the clamp, a plurality of individual hooks about which insulated wires from the cable may be formed manually, disposed parallel with each other and at relative spaced positions on the arm, a pantograph linkage unit supported by the arm connected through the links thereof to the hooks and having one end fixed whereby movement of the free end will actuate the unit to cause simultaneous movement of the hooks to vary their relative positions on the arm, a slide movable on the arm and connected to the free end of the unit to actuate the unit to predetermined positions, and indicia markings disposed on the arm for registration with the slide to indicate the predetermined positions.

9. An adjustable cable forming fixture comprising a support, a clamp mounted on the support and adapted to removably hold a sheathed cable having the sheath removed back a given distance from the ends of the insulated wires thereof, an arm mounted on the support with one end thereof adjacent the clamp, a plurality of individual hooks about which insulated wires from the cable may be formed manually, disposed parallel with each other and at relative spaced positions on the arm, a pantograph linkage unit supported by the arm connected through the links thereof to the hooks and having one end fixed whereby movement of the free end will actuate the unit to cause simultaneous movement of the hooks to vary their relative positions on the arm, a slide movable on the arm and connected to the free end of the unit to actuate the unit to predetermined positions, indicia markings disposed on the arm for registration with the slide to indicate the predetermined positions, and indicia markings on the arm for a given central one of the hooks and corresponding to the indicia markings for the slide whereby additional adjustment of the unit may be made through the central hook.

References Cited in the file of this patent

UNITED STATES PATENTS

| | | |
|---|---|---|
| 638,538 | Williams | Dec. 5, 1899 |
| 642,296 | Carter | Jan. 30, 1900 |
| 811,357 | Azary | Jan. 30, 1906 |
| 936,123 | Grimm | Oct. 5, 1909 |
| 1,007,968 | Paul | Nov. 7, 1911 |
| 1,013,958 | Schroter | Jan. 9, 1912 |
| 2,086,736 | Palmer | July 13, 1937 |
| 2,219,887 | Bowly | Oct. 29, 1940 |
| 2,429,015 | Contrastano | Oct. 14, 1947 |
| 2,744,546 | Williams | May 8, 1956 |